United States Patent [19]

Tadashi et al.

[11] Patent Number: 4,682,401

[45] Date of Patent: Jul. 28, 1987

[54] MULTIPLE PROCESSING MACHINE

[75] Inventors: Hirata Tadashi, Yamato; Satou Yoshirou, Atsugi; Tsutsui Yoshimitsu, Hatano, all of Japan

[73] Assignee: Amada Company, Limited, Japan

[21] Appl. No.: 610,478

[22] Filed: May 15, 1984

[30] Foreign Application Priority Data

May 19, 1983 [JP] Japan .................. 58-086634

[51] Int. Cl.⁴ ............................................. B23G 3/155
[52] U.S. Cl. ..................... 29/568; 29/34 R; 29/563; 72/464; 83/405; 83/519
[58] Field of Search ............. 29/34 R, 563, 564, 565, 29/566, 568; 83/405, 513, 519; 72/404, 464, 446; 100/207, 208, 918

[56] References Cited

U.S. PATENT DOCUMENTS

| | | | |
|---|---|---|---|
| 2,167,279 | 7/1939 | Manny | 29/565 X |
| 2,249,230 | 7/1941 | Schafer | 29/563 X |
| 3,816,904 | 6/1974 | Herb | 29/568 |
| 3,835,682 | 9/1974 | Elger | 72/404 X |
| 3,961,512 | 6/1976 | Mentis | 83/405 X |
| 3,979,985 | 9/1976 | Daniels | 29/563 X |
| 4,030,172 | 6/1977 | Gentry | 72/404 X |
| 4,052,280 | 10/1977 | Daniels | 29/563 X |
| 4,106,183 | 8/1978 | Brolund et al. | 29/564 |
| 4,220,062 | 9/1980 | Blanz | 83/405 X |
| 4,250,784 | 2/1981 | Bredow | 83/519 X |
| 4,304,041 | 12/1981 | Kline et al. | 72/404 X |
| 4,391,123 | 7/1983 | Salvagnini | 72/464 |
| 4,437,224 | 3/1984 | Bredow et al. | 29/568 |
| 4,457,160 | 7/1984 | Wunsch | 72/464 X |
| 4,471,641 | 9/1984 | Mitchell | 83/405 X |
| 4,486,941 | 12/1984 | Scott et al. | 29/568 |
| 4,520,550 | 6/1985 | Dunn et al. | 29/568 |
| 4,532,794 | 8/1985 | Mauderer | 72/464 X |

Primary Examiner—Gil Weidenfeld
Assistant Examiner—Glenn L. Webb
Attorney, Agent, or Firm—Wigman & Cohen

[57] ABSTRACT

The present invention relates to a multiple processing machine having a punch press for punching a sheet-like workpiece and a ram-operated forming press for performing a variety of forming operations such as bending, shearing, and drawing on the workpiece. The punch press and forming press are interconnected with each other along a central partition. A feeding device is also provided adjacent the punching and forming press on a central worktable. In addition, a tool changing device is provided to change the tools in either or both of the punching and forming presses.

9 Claims, 8 Drawing Figures

MULTIPLE PROCESSING MACHINE

BACKGROUND OF THE INVENTION

1. Field of the Invention

The present invention relates generally to a processing machine for punching and forming sheet-like workpieces such as sheet metal and, more particularly, to a multiple processing machine which is capable of performing a variety of punching and forming operations including bending and shearing on sheet-like workpieces with high efficiency.

2. Description of the Prior Art

It is very often necessary to punch a variety of holes in sheet-like workpieces such as sheet metal and then perform a variety of forming operations such as bending, shearing and drawing on such workpieces. Heretofore, it has been customary that two machines namely a punching press and a forming press are separately used to punch and form sheet-like workpieces. It is disadvantageous to transfer the workpieces from the punching press to the forming press and the machinery is complicated and bulky and needs a wide floor space. Also, it has been necessary not only to transfer the workpieces after punching in the punching press but also to position them again in the forming press. Accordingly, it has been also disadvantageous that a considerable time is necessary to re-position the workpieces before beginning forming operations and it has been difficult to increase the efficiency and accuracy.

SUMMARY OF THE INVENTION

It is an object of the present invention to provide a multiple processing machine which is capable of performing a variety of punching and forming operations including bending and shearing on sheet-like workpieces such as sheet metals.

It is another object of the present invention to provide a compact multiple processing machine which can perform punching and forming operation with high efficiency.

It is a further object of the present invention to provide a multiple processing machine in which tools can be easily changed to perform a variety of punching and forming operations.

In order to accomplish these objects, a multiple processing machine according to the present invention is provided with a punching means and a forming means connected with each other and a feeding means for feeding and positioning workpieces into the punching and forming means. Also, the multiple processing machine is provided with a tool changing means for changing tools to perform a variety of punching and forming operations.

Other and further objects and advantages of the present invention will be apparent from the description and accompanying drawings which, by way illustration, show a preferred embodiment of the present invention and the principles thereof.

DESCRIPTION OF THE PREFERRED EMBODIMENT

Figure 1:
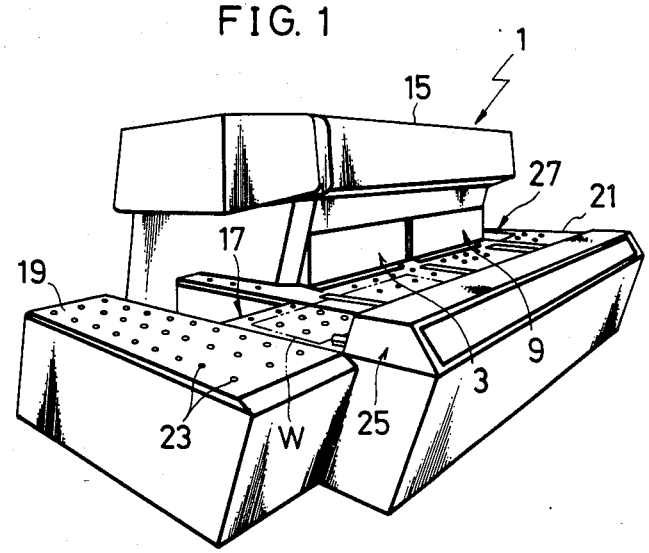
FIG. 1 is a perspective view of a multiple processing machine embodying the principles of the present invention.
Figure 2:
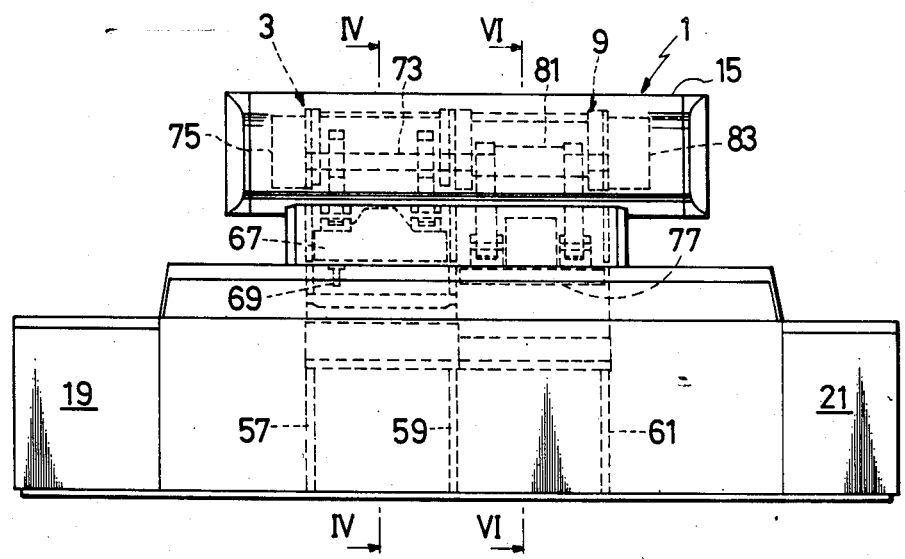
FIG. 2 is a front elevational view of the multiple processing machine shown in FIG. 1
Figure 3:
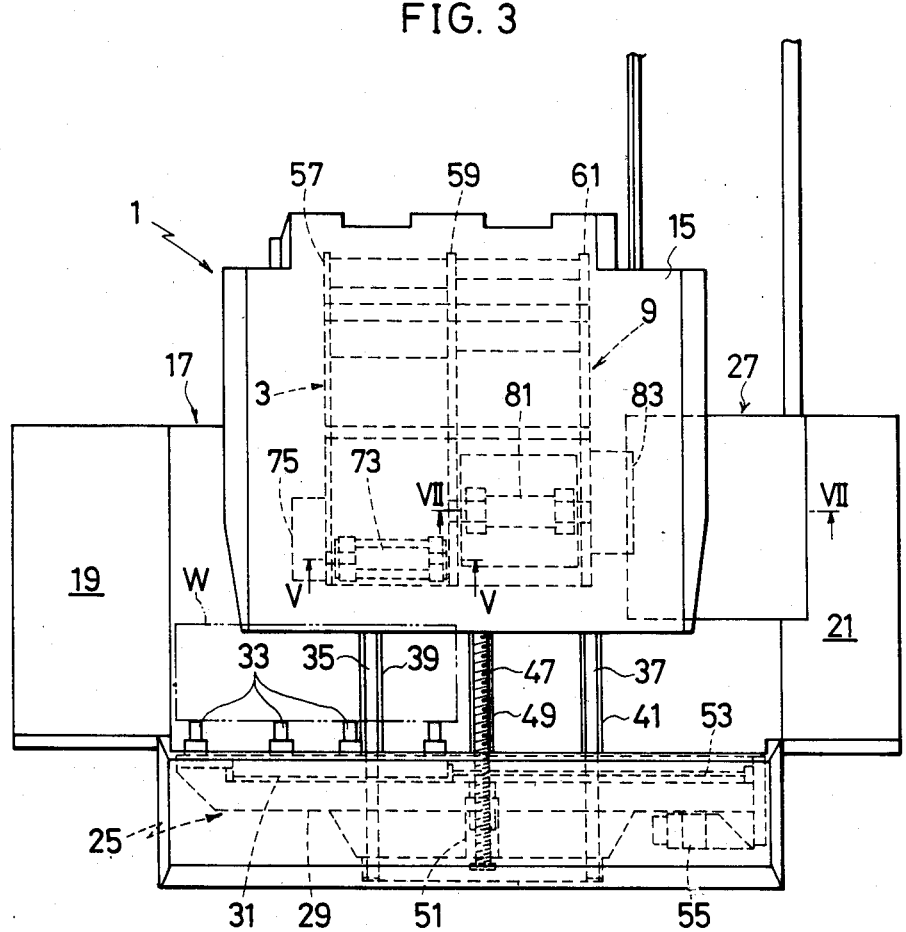
FIG. 3 is a plan view of the multiple processing machine shown in FIGS. 1 and 2.

Referring to FIGS. 1 through 3, there is shown a multiple processing machine which is generally designated by the numeral 1 and has been designed to punch and form a work-sheet W such as sheet metal. The multiple processing machine 1 comprises a punching press 3 having upper and lower punching tools 5 and 7 and a forming press 9 having upper and lower forming tools 11 and 13. The punching press 3 and the forming press 9 are integrally constructed or integrally connected with each other by suitable means and they are covered by a cover 15. As will be described in great detail hereinafter, the punching press 3 is worked to punch a variety of holes on the work-sheet W, and the forming press 9 is worked to perform a variety of forming operations such as bending, shearing and drawing including beading, louvering and burring on the work-sheet W. The multiple processing machine 1 comprises also a central work-table 17 so that the work-sheet W may be placed thereon and slid and fed into the punching press 3 and the forming press 9. In the preferred embodiment, the multiple processing machine 1 is further provided with a pair of side work-tables 19 and 21 which are disposed on both sides of the central work-table 17 and level therewith. The central work-table 17 and the side work-tables 19 and 21 are provided at their top surfaces with a plurality of ball sliders 23 so that the work-sheet W can freely slide thereon. The multiple processing machine 1 further comprises a work-sheet feeding apparatus 25 so as to feed and position the work-sheet W into the punching press 3 and the forming press 9. Also, the multiple processing machine 1 is provided with a tool changing apparatus 27 to change the upper and lower forming tools 11 and 13 in the forming press 9.

Referring especially to FIG. 3, the work-sheet feeding apparatus 25 is movably mounted on the central work-table 17 so that it may be horizontally moved backward and frontward, toward and away from the punching press 3 and the forming press 9. The work-sheet feeding apparatus 25 comprises a first carriage 29 which is movable on the central work-table 17 and a second carriage 31 which is movably mounted on the first carriage 29 and is provided with a plurality of clamping means 33 for clamping the work-sheet W. The first carriage 29 is movably mounted on a pair of rails 35 and 37 on the central work-table 17 so that it may be horizontally moved toward and away from the punching press 3 and the forming press 9. Specifically, the rails 35 and 37 are horizontally disposed in parallel with each other in slits 39 and 41, respectively, which are formed in the central work-table 17. The first carriage 29 is so arranged as to be moved on the rails 35 and 37 by a lead screw 47 which is horizontally disposed in a slit 49 formed on the central work-table 17 and is driven by a motor 51 mounted on a portion of the central work-table 17. Also the second carriage 31 is so arranged as to be horizontally moved on the first carriage 29 by a lead screw 53 which is horizontally disposed on the first carriage 29 at right angles to the rails 35 and 37 and is driven by a motor 55. In this connection, the motors 51 and 55 are numerically controlled to drive the first and second carriages 29 and 31 of the work-sheet feeding apparatus 25.

In the above described arrangement, the first carriage 29 of the work-sheet feeding apparatus 25 will be moved by the lead screw 47 on the rails 35 and 37 toward and away from the punching press 3 and the forming press 9 to carry the second carriage 31, when the motor 51 is in motion. Of course, when the first carriage 29 is moved, the work-sheet W which is clamped by the clamping means 33 held on the second carriage 31 will be moved toward and away from the punching press 3 and the forming press 9. Also, when the motor 55 is in motion, the second carriage 31 will be moved by the lead screw 53 on the first carriage 29 to move the work-sheet W along the course which is normal to the rails 35 and 37. Thus, the work-sheet W can be fed and positioned anywhere in the punching press 3 and the forming press 9 by moving both or either of the first and second carriages 29 and 31 of the work-sheet feeding apparatus 25.

Figure 4:
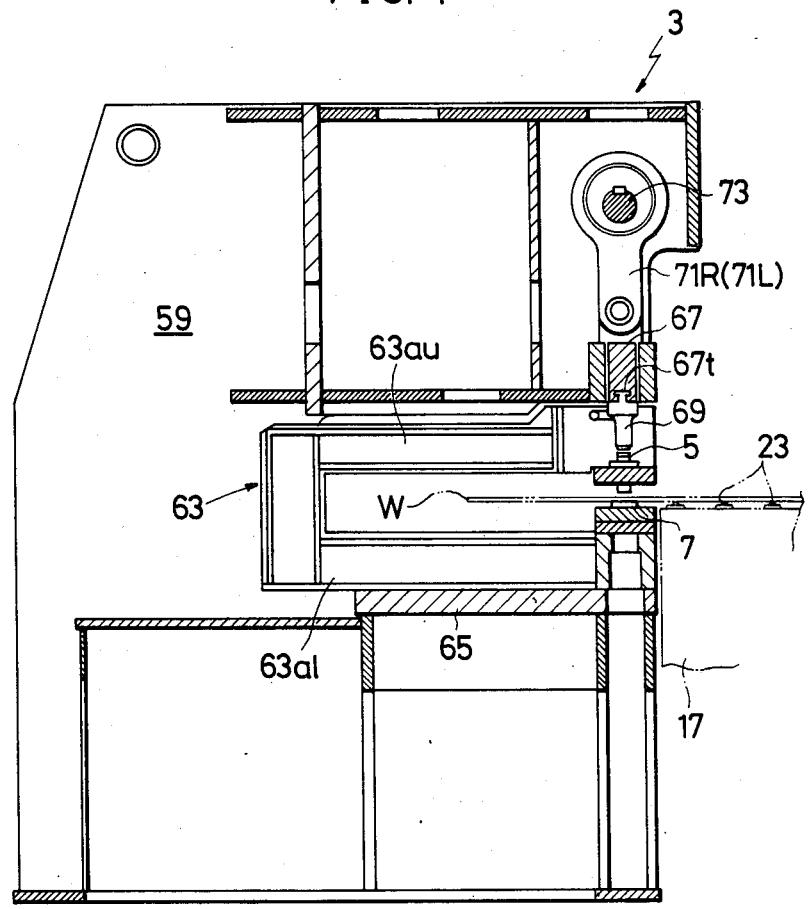
FIG. 4 is an enlarged sectional view taken along the line IV—IV of FIG. 2 with portions omitted for clarity.

As seen from FIGS. 2 and 3, the punching press 3 and the forming press 9 are integrally constructed of three upright plates 57, 59 and 61, each of which may be C-shaped as shown in FIG. 4. The upright plates 57, 59 and 61 are vertically disposed in parallel with each other under the cover 15 and behind the central work-table 17. Of course, the upright plate 57 is integrally connected to the upright plate 59 at a space by means of suitable connecting members, and the upright plate 59 is also integrally connected to the upright plate 61 in the similar manner. In this connection, the punching press 3 and the forming press 9 can be separately constructed and connected with each other by suitable means such as bolts, although they are integrally constructed of the three upright plates 57, 59 and 61 in the preferred embodiment. Stated otherwise, another upright plate can be employed for the punching press 3 or the forming press 9 in addition to the three upright plates 57, 59 and 61 in such a manner as to be integrally connected to the upright plate 59.

Figure 5:
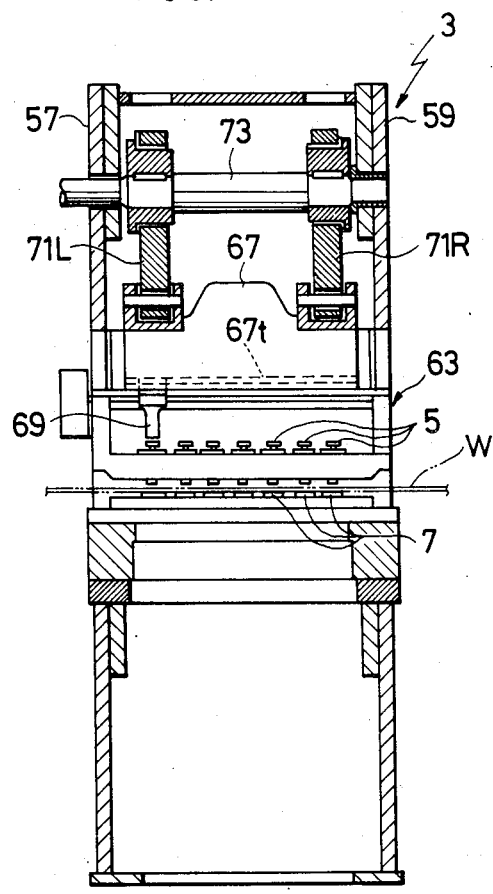
FIG. 5 is an enlarged sectional view taken along the line V—V of FIG. 3 with portions omitted for clarity.

Referring to FIGS. 4 and 5, the punching press 3 is provided with a tool holding unit 63 to hold the upper and lower punching tools 5 and 7, both of which are plural in number. The tool holding unit 63 is C-shaped in vertical cross section in such a manner as to have an upper arm 63au and a lower arm 63al which are formed to extend horizontally in parallel with each other to hold the upper and lower punching tools 5 and 7, respectively. The tool holding unit 63 is mounted on a bed 65 between the upright plates 57 and 59 at the front portion of the punching press 3 in connection with the central work-table 17 in a manner such that the upper and lower arms 63au and 63al extend forwardly. The upper punching tools 5 are detachably mounted at the front end of the upper arm 63au of the tool holding unit 63 in a horizontal line normal to the rails 35 and 37 for the work-sheet feeding apparatus 25. The lower punching tools 7 are also detachably mounted at the front end of the lower arm 63al of the tool holding unit 63 in a horizontal line in the same manner as the upper punching tools 5. The upper and lower punching tools 5 and 7 are varied in size and shape, and pairs of the upper and lower punching tools 5 and 7 common in size and shape are disposed in vertical alignment with each other to cooperate with each other to punch the work-sheet W. In this arrangement, the work-sheet W to be punched is fed and positioned between the upper and lower punching tools 5 and 7 in punching operations by the work-sheet feeding apparatus 25.

Referring again to FIGS. 4 and 5, the punching press 3 is also provided with a ram 67 which has a striker 69 at its lower end to act on the upper and lower punching tools 5 and 7 in punching operations. The ram 67 is vertically movably disposed between the upright plates 57 and 59 and is connected by means of a pair of connecting rods 71R and 71L to an eccentric shaft 73 which is horizontally held between the upright plates 57 and 59 and is driven by a motor (not shown) through a clutch and brake unit 75. Of course, the ram 67 is so disposed as to be raised and lowered by the eccentric shaft 73 and enable the striker 69 to act on the upper and lower punching tools 5 and 7 when lowered. Also, the striker 69 is held in a T-slot 67t which is horizontally formed along the lower end of the ram 67, and it is so arranged as to be laterally moved or shifted in the T-slot 67t just over the upper and lower punching tools 5 and 7. The arrangement is such that in punching operations the striker 69 will be laterally shifted at the lower end of the ram 67 to selectively act on a desired pair of the upper and lower punching tools 5 and 7 when lowered by the ram 67. In this connection, the striker 69 is laterally moved on the ram 67 in a suitable manner under a numerical control which is connected also to the motors 51 and 55 for driving the first and second carriages 29 and 31 of the work-sheet feeding apparatus 25.

In the above described arrangement, in punching operations the work-sheet W is fed and positioned between the upper and lower punching tools 5 and 7 of the punching press 3 by the work-sheet feeding apparatus 25. Before or as soon as the work-sheet W is positioned between the upper and lower punching tools 5 and 7, the striker 69 held by the ram 67 is laterally moved thereon and positioned just over a desired pair of the upper and lower punching tools 5 and 7. Then, when the ram 67 is lowered by the eccentric shaft 73, the striker 69 will be lowered to enable the desired pair of the upper and lower punching tools 5 and 7 to punch the work-sheet W which is held by the clamping means 33 of the work-sheet feeding apparatus 25. Of course, a number of holes varied in size and shape can be automatically and continuously punched in the work-sheet W by moving the striker 69 on the ram 67 and the first and second carriages 29 and 31 of the work-sheet feeding apparatus 25 under a numerical control.

As seen from the above description, the upper and lower punching tools 5 and 7 of the punching press 3 are held by the tool holding unit 63 away from the frame of the punching press 3 including the upright plates 57 and 59 which are subjected to reactions occurring during punching operations. Accordingly, the upper and lower punching tools 5 and 7 can be kept in vertical alignment with each other to perform accurate punching operations.

Figure 6:
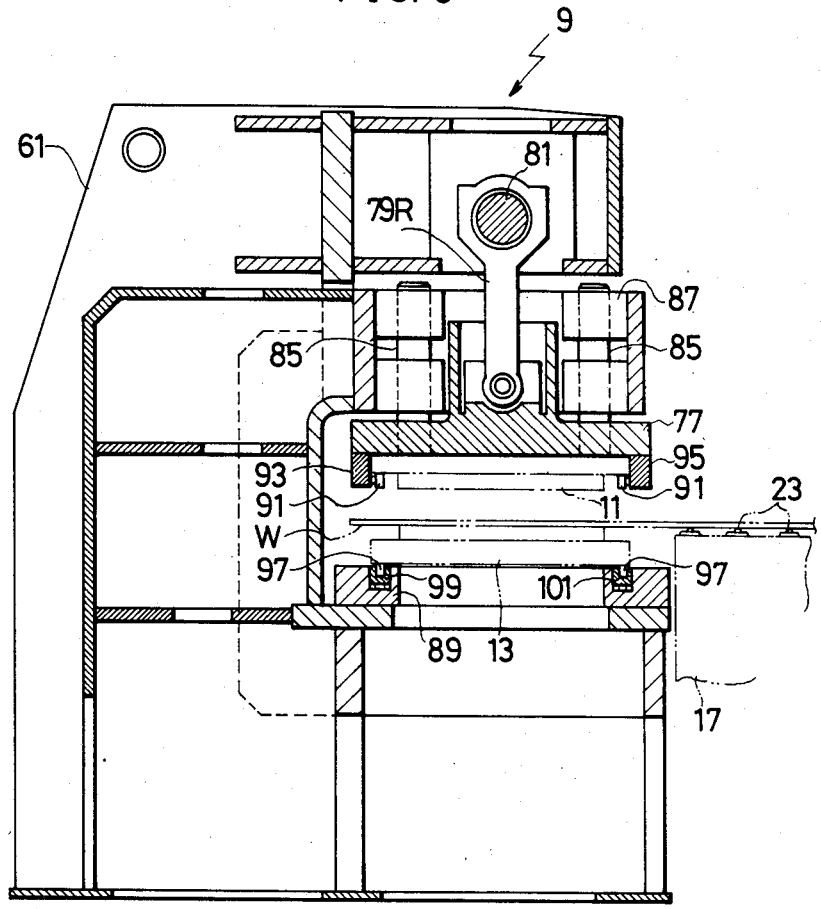
FIG. 6 is an enlarged sectional view taken along the line VI—VI of FIG. 2 with portions omitted for clarity.
Figure 7:
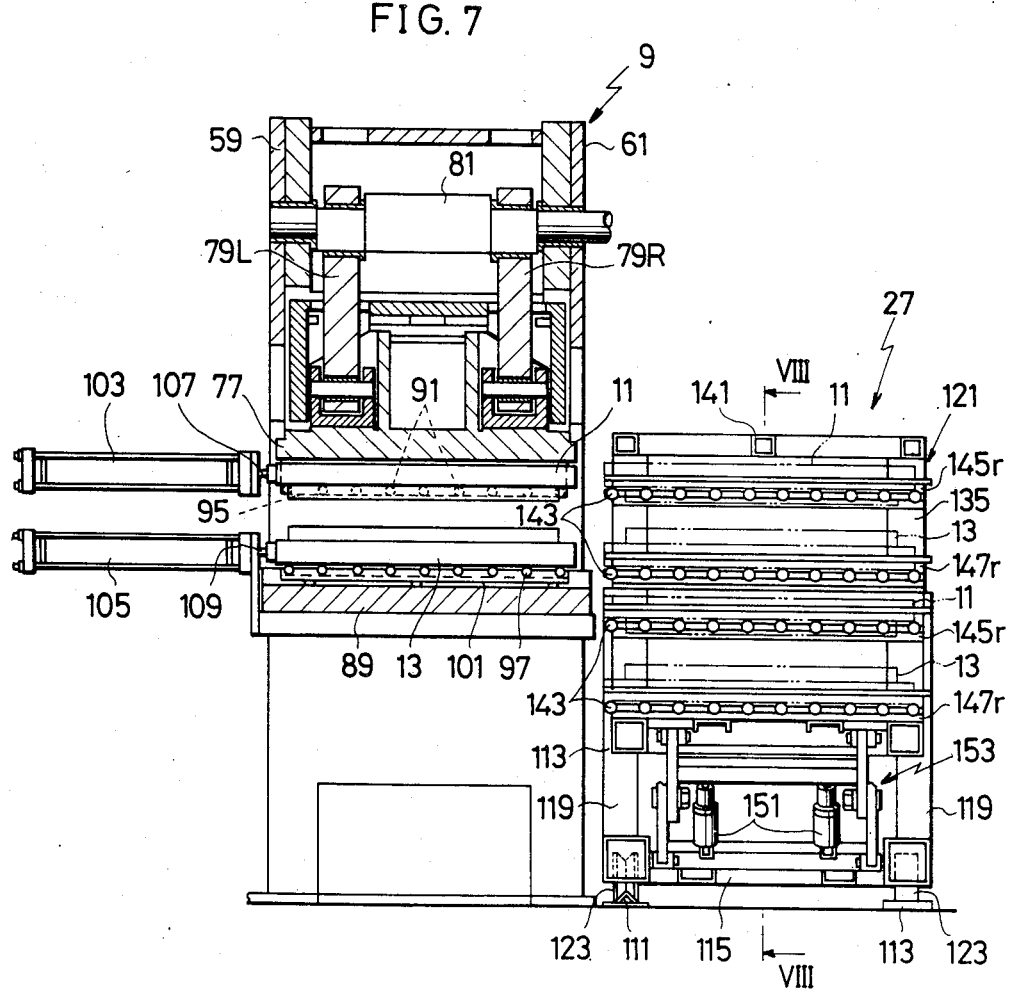
FIG. 7 is an enlarged sectional view taken along the line VII—VII of FIG. 3 with portions omitted for clarity.

Referring to FIGS. 6 and 7, the forming press 9 is provided with a ram 77 which is vertically movably disposed between the upright plates 59 and 61 to carry the upper forming tool 11. The ram 77 is connected by means of a pair of connecting rods 79R and 79L to an eccentric shaft 81 which is horizontally held between the upright plates 59 and 61 and is driven by a motor (not shown) through a clutch and brake unit 83. In the preferred embodiment, the ram 77 is provided with a plurality of vertical guide rods 85 and is held guided by a guide member 87 in which the guide rods 85 are vertically slidably held. The guide member 87 is disposed between the upright plates 59 and 61 in a cantilever manner to horizontally extend frontwardly so that the ram 77 may be vertically movable therein. The upper forming tool 11 is detachably fixed to the underside of the ram 77 by a suitable means such as a clamping means of a hydraulic motor. Also, the lower forming tool 13, which is located just beneath the upper forming tool 11, is detachably mounted on a bolster 89 which is provided just beneath the ram 77, and it is kept fixed by a suitable means such as a clamping means of a hydraulic motor.

In the above described arrangement, in forming operations the work-sheet W is fed and positioned into the lower forming tool 13 of the forming press 9 by the work-sheet feeding apparatus 25. Then, when the ram 77 is lowered by the eccentric shaft 81, the upper forming tool 11 will be lowered to cooperate with the lower forming tool 13 to form the work-sheet W. In this connection, it is to be noted that various kinds of forming tools can be used to perform a variety of forming operations such as bending, shearing and drawing including notching as well as beading, louvering and burring, although the upper and lower forming tools 11 and 13 have not been shown in detail in the preferred embodiment.

Referring again to FIGS. 6 and 7, in order to facilitate changing of the upper forming tool 11, a plurality of rollers 91 are provided on the underside of the ram 77 so that the upper forming tool 11 may slide thereon horizontally. The rollers 91 are freely rotatably disposed in two rows on a pair of elongated holding members 93 and 95 which are horizontally fixed to the underside of the ram 77 in parallel with each other so that the upper forming tool 11 may slide thereon rightward and leftward as viewed in FIG. 7. In order to facilitate also changing of the lower forming tool 13, a plurality of rollers 97 are provided on both of the front and rear edges of the bolster 89 so that the lower forming tool 13 may horizontally slide thereon in the directions as the upper forming tools 11. The rollers 97 are freely rotatably disposed in two rows on a pair of elongated holding members 99 and 101 which are provided on the front and rear edges, respectively, of the bolster 89 in parallel with each other. The holding members 99 and 101 for the lower forming tool 13 are vertically movably disposed and are so arranged as to be raised by a suitable means such as hydraulic motors to project the rollers 97 out of the top surface of the bolster 89 only when the lower forming tool 13 is to be moved thereon. Also, hydraulic or pneumatic motors 103 and 105 having piston rods 107 and 109, respectively, are so provided as to move the upper and lower forming tools 11 and 13, respectively.

The hydraulic or pneumatic motors 103 and 105 are horizontally mounted on the upright plate 59 in a manner such that their piston rods 107 and 109 will horizontally project to pull onto and push out of the ram 77 and the bolster 89, respectively. In order to enable the hydraulic or pneumatic motors 103 and 105 to move the upper and lower forming tools 11 and 13, the arrangement may be such that a T bolt is fixed to each of the piston rods 107 and 109 and a T-slot is vertically formed at each end of the upper and lower forming tools 11 and 13 so that the T bolt may engage with the T-slot.

In the above described arrangement, the upper forming tool 11 is pulled and pushed by the hydraulic or pneumatic motor 103 on the rollers 91 when it is to be mounted onto and removed from the ram 77. The upper forming tool 11 raised by a suitable means such as a clamping means of a hydraulic motor to be mounted onto the ram 77 from the rollers 91, and it is lowered onto the rollers 91 from the ram 77 when released from such a clamping means. The lower forming tool 13 is also pulled and pushed by the hydraulic or pneumatic motor 105 on the rollers 97 which have been raised out of the top surface of the bolster 89, when it is to be mounted onto and removed from the bolster 89. The lower forming tool 13 will be mounted onto the bolster 89 when the rollers 97 are lowered by the holding members 99 and 101 from the top surface of the bolster 89.

Figure 8:
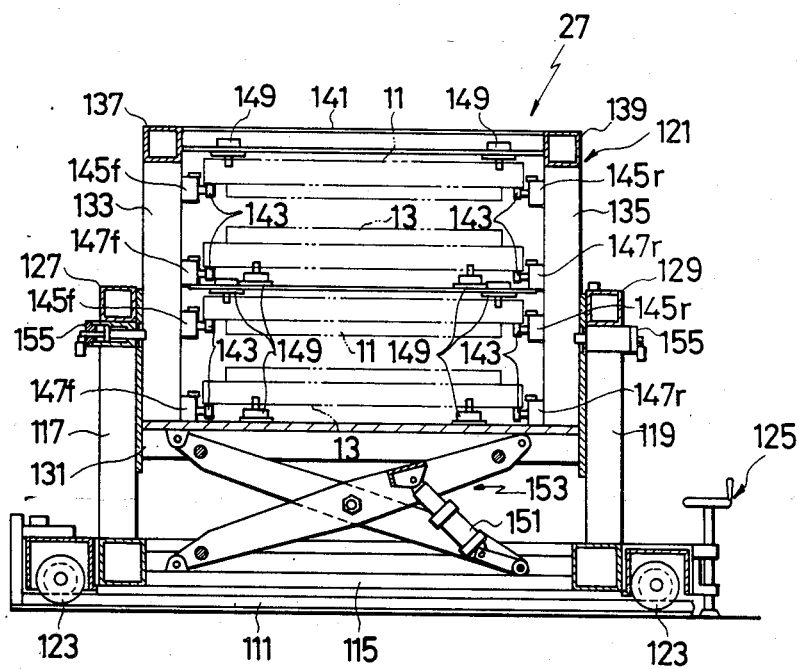
FIG. 8 is a sectional view taken along the line VII—VII of FIG. 7.

Referring to FIGS. 7 and 8, the tool changing apparatus 27 is placed at the side of the forming press 9 to send and receive the upper and lower forming tools 11 and 13 onto and from the rollers 91 and 97, respectively, of the forming press 9. The tool changing apparatus 27 is movably disposed on a pair of rails 111 and 113 which are laid in parallel with the rails 35 and 37 for the work-sheet feeding apparatus 25. The tool changing apparatus 27 comprises a rectangular base 115 on which a pair of front guide posts 117 and a pair of rear guide posts 119 are vertically fixed, and it comprises also a tool holding carriage 121 which is vertically mounted on the base 115 to hold the upper and lower forming tools 11 and 13. The base 115 is movably placed on the rails 111 and 113 by means of wheels 123 and is kept stopped in position by a stopping means 125. The front guide posts 117 are fixed at the front end of the base 115 and are connected with each other by a beam member 127, and the rear guide posts 119 are disposed at the rear end of the base 115 and are connected with each other by another beam member 129.

The tool holding carriage 121 of the tool changing apparatus 27 is so arranged as to be vertically moved along the guide posts 117 and 119 to send and receive the upper and lower forming tools 11 and 13 onto and from the rollers 91 and 97, respectively, of the forming press 9. The tool holding carriage 121 comprises a rectangular base 131 on which a pair of front posts 133 and a pair of rear posts 135 are vertically fixed. The front posts 133 are connected with each other by a beam member 137, and the rear posts 135 are connected likewise by a beam member 139 and also the beam members 137 and 139 are connected with each other by a plurality of beam members 141. The tool holding carriage 121 is provided with a plurality of rollers 143 on which the upper and lower forming tools 11 and 13 are horizontally slidably held to be moved onto and from the rollers 91 and 97, respectively, of the forming press 9. The rollers 143 are freely rotatably disposed on an upper pair of front and rear holding members 145$f$ and 145$r$ and a lower pair of front and rear holding members 147$f$ and 147$r$. The upper front and rear holding members 145$f$ and 145$r$ are horizontally fixed on a level with each other to the front posts 133 and the rear posts 135, respectively, to enable the rollers 143 to hold the upper forming tool 11. The lower front and rear holding members 147$f$ and 147$r$ are likewise fixed to the front posts 133 and the rear posts 139, respectively, to enable the rollers 143 to hold the lower forming tool 13. In the preferred embodiment, two sets of the upper front and rear holding members 145f and 145r and the lower front and rear holding members 147f and 147r are provided so as to hold two pairs of the upper and lower forming tools 11 and 13. The arrangement is such that the rollers 143 on the upper front and rear holding members 145f and 145r and the lower front and rear holding members 147f and 147r will be brought onto the same levels as the rollers 91 and 97 by the tool holding carriage 121 which is vertically moved. It will be understood that the upper and lower forming tools 11 and 13 can be sent onto and received from the rollers 91 and 97 of the forming press 9 when the rollers 143 of the tool holding carriage 121 are on the same levels as the rollers 91 and 97. Also, there are provided a plurality of fixing means 149 so as to fix the upper and lower forming tools 11 and 13 on the tool holding carriage 121.

In order to move the tool holding carriage 121 along the guide posts 117 and 119, a plurality of hydraulic or pneumatic motors 151 are connected to the underside of the base 131 by means of a link mechanism 153. Also, a plurality of fixing means 155 such as hydraulic or pneumatic motors are provided to fix the tool holding carriage 121 at its raised position on the guide posts 117 and 119.

In the above described arrangement, the tool holding carriage 121 is moved along the guide posts 117 and 119 to bring the rollers 143 onto the same levels as the rollers 91 and 97 of the forming press 9 when it is desired to change the upper and lower forming tools 11 and 13. In order to receive the upper and lower forming tools 11 and 13 from the forming press 9, of course the rollers 143 having no tools are brought by the tool holding carriage 121 onto the same levels as the rollers 91 and 97 of the forming press 9. Then, the upper and lower forming tools 11 and 13 which have been mounted on the forming press 9 are moved by the hydraulic or pneumatic motors 103 and 105, respectively, on the rollers 91 and 97, respectively, onto the rollers 143 of the tool holding carriage 121. Of course, before being moved by the hydraulic or pneumatic motors 103 and 105, the upper forming tool 11 is unloaded from the ram 77 of the forming press 9 onto the rollers 91, and the lower forming tool 13 is raised by the rollers 97 from the bolster 89. After receiving the upper and lower forming tools 11 and 13 from the forming press 9, the tool holding carriage 121 is again moved along the guide posts 117 and 119 to send another pair of the upper and lower forming tools 11 and 13 onto the rollers 91 and 97 of the forming press 9. Then, the upper and lower forming tools 11 and 13 are pulled by the hydraulic or pneumatic motors 103 and 105, respectively, onto the rollers 91 and 97, respectively, of the forming press 9 from the tool holding carriage 121 to be mounted onto the ram 77 and the bolster 89.

As has been described above, the multiple processing machine 1 according to the present invention, can perform a variety of punching and forming operations with high efficiency. The punching press 3 can punch a variety of holes on the work-sheet W, and the forming press 9 can perform a variety of forming operations such as bending, shearing and drawing by use of various types of the upper and lower forming tools 11 and 13. Also, the punching press 3 and the forming press 9 are connected with each other as a single compact construction so that the work-sheet W can be fed and positioned thereinto by the single common work-sheet feeding apparatus 25. Accordingly, not only is any additional transferring apparatus eliminated thereby minimizing the necessary floor space, but also the work-sheet W can be quickly fed and positioned into the forming press 11 with high efficiency and accuracy after having been punched by the punching press 3. Furthermore, various types of the upper and lower forming tools 11 and 13 can be easily mounted onto the forming press 3 by the tool changing apparatus 27 to perform a variety of forming operations.

Although a preferred form of the present invention has been illustrated and described, it should be understood that the device is capable of modification by one skilled in the art without departing from the principles of the invention. Accordingly, the scope of the invention is to be limited only by the appended hereto.

We claim:

1. A multiple processing machine for performing a variety of punching and forming operations on sheet-like workpieces comprising:
   a frame including first, second and third vertically disposed support plates;
   first ram-operated means for punching a sheet-like workpiece;
   a first eccentric shaft mounted between said first and second support plates for driving said punching means;
   second ram-operated means positioned adjacent said first ram-operated means for impact forming the sheet-like workpiece;
   a second eccentric shaft mounted between said second and third support plates for driving said impact forming means;
   a first carriage provided on said frame for moving the sheet-like workpiece toward and away from said punching means and said impact forming means; and
   a second carriage mounted on said first carriage and movable generally perpendicular thereto for positioning the sheet-like workpiece relative to said punching means and said impact forming means;
   a bolster provided on said frame beneath said second ram-operated means for support of a lower forming tool;
   a plurality of lower tool rollers supported by said bolster;
   means for moving said lower tool rollers with respect to said bolster between a raised position to contact and support said lower tool and a lowered positioned in which said lower tool is supported by said bolster;
   a tool changing apparatus provided on said frame adjacent said second ram-operated means for support of a lower forming tool, said tool changing apparatus having means for storing said lower tool; and
   means provided on said frame for exchanging said lower tool between said bolster and said tool changing apparatus.

2. The multiple processing machine of claim 1 wherein a groove is formed in said bolster and the means for moving said lower tool rollers between said raised and lowered positions comprises a holding member which supports said lower tool rollers and which is retained within said groove formed in said bolster.

3. The multiple processing machine by claim 1 further comprising:

an upper tool holding member supported underneath said second ram-operated means for support of an upper tool;

a plurality of upper tool rollers supported by said upper tool holding member;

said tool changing apparatus further having means for storing said upper tool; and means provided on said frame for exchanging said upper tool between said upper tool holding means and said tool changing apparatus.

4. The multiple processing machine of claim 3 wherein said tool changing apparatus further comprises means for storing a plurality of upper tools and a plurality of lower tools.

5. The multiple processing machine of claim 1, wherein said tool changing apparatus is vertically movable.

6. The multiple processing machine of claim 5, wherein said tool changing apparatus is horizontally movable.

7. The multiple processing machine of claim 1, wherein said support plates are rigidly connected to one another.

8. The multiple processing machine of claim 1, wherein said support plates have a C-shaped profile.

9. The multiple processing machine of claim 1, wherein said punching means includes upper and lower tools supported in vertical alignment by tool holding means, and said tool holding means being mounted independently of said support plates so that reactive forces generated by punching operations are absorbed by said support plates and not transmitted to said tool holding means, whereby the vertical alignment of said upper and lower tools is accurately maintained.

* * * * *